United States Patent [19]
Woodard

[11] 3,874,246
[45] Apr. 1, 1975

[54] CABLE PULLEY DRIVE DEVICE

[76] Inventor: Boyd Woodard, 6995 N.W. 32 Ave., Miami, Fla. 33147

[22] Filed: Feb. 25, 1974

[21] Appl. No.: 445,555

[52] U.S. Cl.............. 74/224, 74/225, 74/242.14 R
[51] Int. Cl. .......................... F16h 7/00, F16h 7/10
[58] Field of Search.............. 24/224, 225, 248.14 R

[56] References Cited
UNITED STATES PATENTS

| 1,861,133 | 5/1932 | Reid.................................. 74/224 X |
| 2,619,222 | 11/1952 | Przybylski................. 74/242.14 R X |
| 3,664,205 | 5/1972 | Luras................................... 74/224 |

FOREIGN PATENTS OR APPLICATIONS

| 491,646 | 1/1930 | Germany ............................. 74/224 |

*Primary Examiner*—Leonard H. Gerin

[57] ABSTRACT

A cable pulley drive device comprised of a double pulley having a pair of relatively closely spaced annular grooves about its peripheral surface to receive a major portion of two turns of a cable, said pulley being rotatably journaled between a pair of opposed side plates. Spaced from the double pulley and rotatably journaled between the side plates is a relatively small single cable transfer pulley, the plane through the center of the annular groove of which bisects the space between the two grooves of the double pulley. A cable passed around the three grooves of the two pulleys provides a top run from one of the double pulley grooves and a bottom run from the other groove. When the double pulley is driven by an appropriate drive means, the cable transfer pulley continuously transfers the cable from one of the double pulley grooves to the other depending upon the direction of rotation thereof.

7 Claims, 6 Drawing Figures

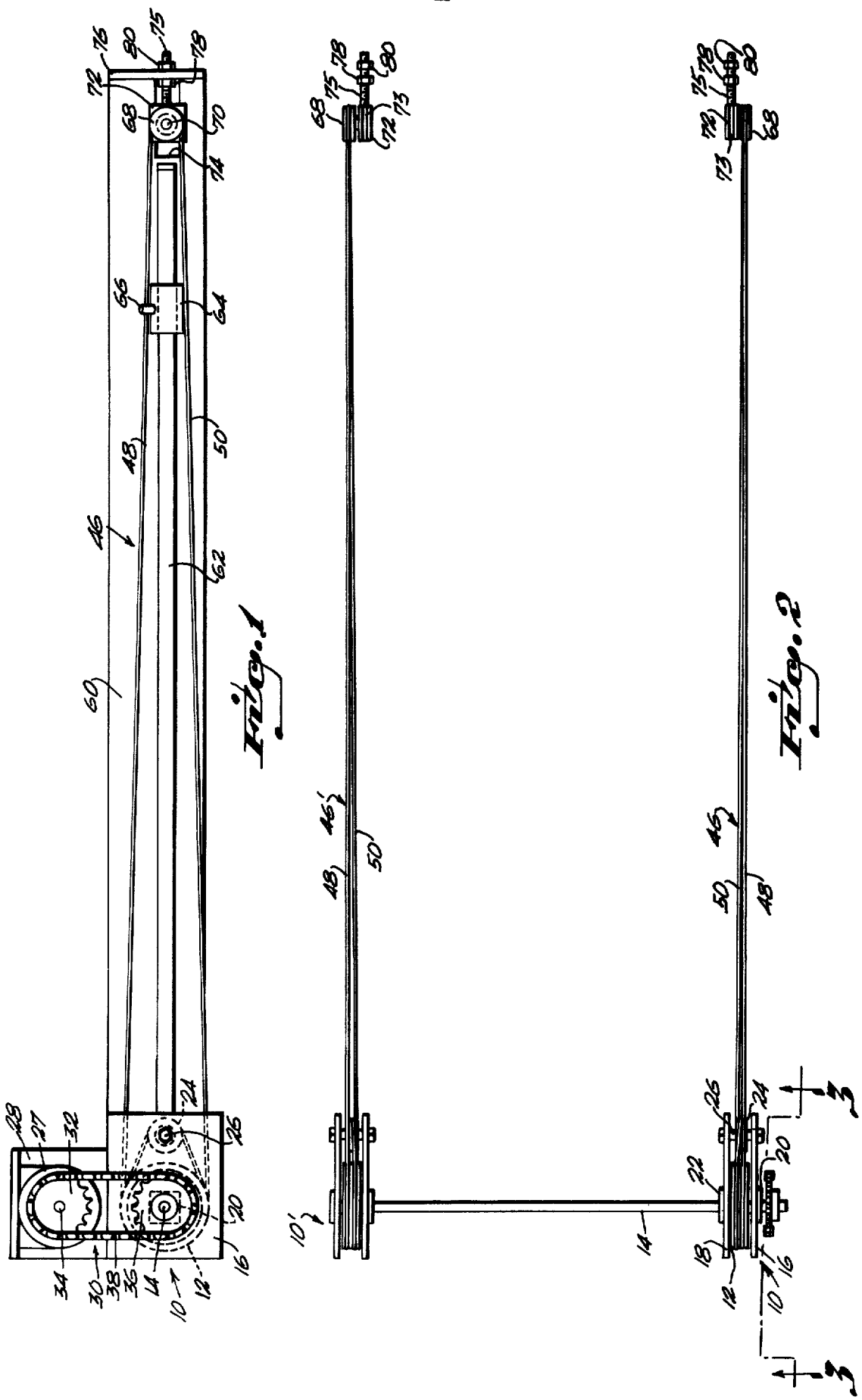

CABLE PULLEY DRIVE DEVICE

FIELD OF THE PRESENT INVENTION

The present invention pertains to a cable pulley drive means having upper and lower cable runs extending therefrom to drive various structures or devices which are designed to be traveled back and forth. For example, two of the cable drive structures may be mounted relative to the opposed, front top edges of the load-carrying body of a dump truck or the like on a common drive shaft spanning the width of the truck and being driven by a reversible drive means such as an electric motor. The two cable runs from each of said cable drive structures would be drivingly engaged with opposite sides of a telescopic or accordion type of cover means for the load-carrying body whereby it may be selectively moved between open and closed conditions relative to the top of the load-carrying body, depending upon the direction of operation of the drive means.

OBJECTS AND ADVANTAGES OF THE PRESENT INVENTION

One of the principal objects of the present invention is to provide a cable pulley drive device which is capable of moving substantial loads without resulting in the cable slipping on the pulley.

Another principal object of the instant invention is to provide such a cable pulley drive device which incorporates a rotatably mounted double pulley providing a pair of closely spaced apart annular grooves in its peripheral surface, each groove receiving a substantial portion of one turn of a cable; and a rotatably mounted, relatively small cable transfer pulley, positioned to continuously pass the cable from one of said double pulley grooves to the other when said double pulley is driven in either direction.

Yet another object of this invention is to provide a cross sectional configuration for said double pulley grooves which provide an increasing purchase between the cable and grooves in proportion to the tension or load applied to the cable runs extending from the double pulley.

A still further object of the present invention is to provide a cable pulley drive device which may incorporate a pair of spaced apart double pulleys, rotatably mounted on a common drive shaft with a rotatable transfer pulley positioned relative to each double pulley to synchronously drive a pair of cables.

Another object of this invention is to provide such a pulley drive device which is relatively inexpensive to manufacture, is easily installed and is consistant in operation.

BRIEF DESCRIPTION OF THE DRAWINGS

FIG. 1 is a side elevational view of a typical installation of the cable pulley drive device of the present invention;

FIG. 2 is a top plan view of a pair of spaced apart double pulley drive devices incorporating a common drive shaft;

DETAILED DESCRIPTION OF THE DRAWINGS

Figure 3:
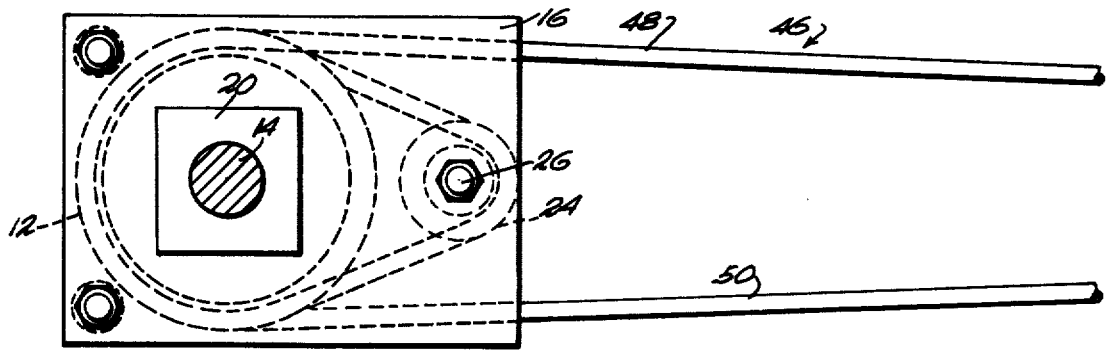
FIG. 3 is an enlarged view taken in cross section along the line 3—3 of FIG. 2.
Figure 4:
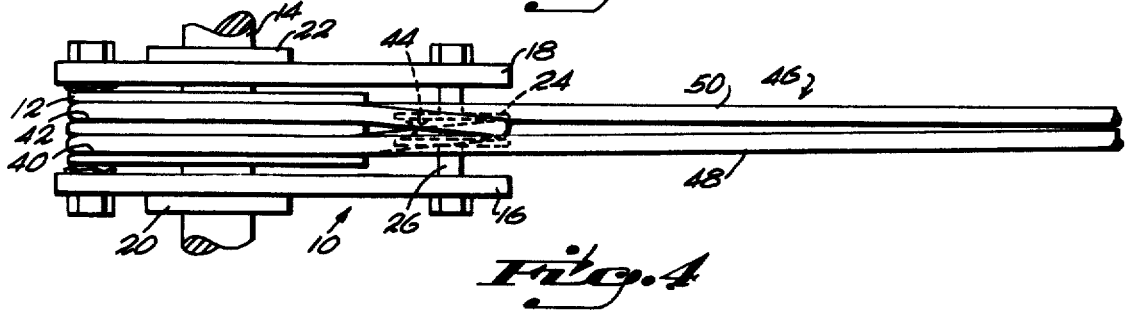
FIG. 4 is a top plan view of FIG. 3.

With reference to the drawings in which like reference characters designate like or corresponding parts throughout the various views, the cable pulley drive device of the present invention is designated generally at 10 and comprises generally a main, double pulley 12 rotatably mounted on a transverse shaft 14, journaled in a pair of opposed side plates 16 and 18 as at 20 and 22. Spaced forwardly of the main, double pulley 12 is a relatively small cable transfer pulley 24, rotatably journaled on a stub shaft 26 fixed between the side plates 16 and 18 as best seen in FIGS. 2 and 4.

A reversible motor drive means 27 is mounted as at 28, relative to the pulley shaft 14, in driving connection therewith as at 30. The driving connection may comprise a first sprocket 32, fixed to the motor shaft 34, a second sprocket 36, fixed to the transverse shaft 14, and a chain 38 engaged thereabout. As illustrated, the motor is carried by the motor mount 28, above the pulley drive device, however, it may be mounted in any convenient position relative thereto.

Figure 5:
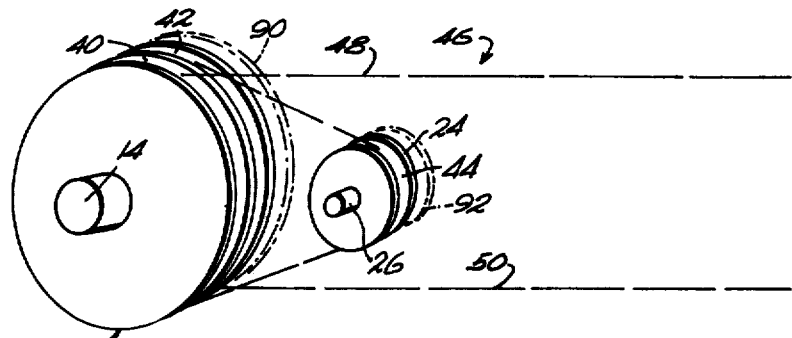
FIG. 5 is an isometric view of a double pulley and cable transfer pulley incorporated in the present invention, the cable associated therewith being indicated by a broken line.

As best illustrated in FIG. 5, the main, double pulley 12 provides a pair of relatively closely spaced grooves 40 and 42 about its peripheral face. The plane through the center of the peripheral groove 44 in the cable transfer pulley 24 bisects the space between the spaced grooves 40 and 42. With further reference to FIG. 5, a drive means such as a cable 46 indicated by broken lines, is, first, passed around the forward side of groove 40 of double pulley 12, second, passed rearwardly around the groove 44 in the cable transfer pulley 24 and, third, forwardly around the groove 42 in the double pulley 12. An upper cable run 48 extends forwardly from the groove 40 and a lower cable run 50 extends rearwardly from the groove 42.

Figure 6:
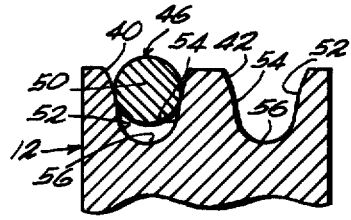
FIG. 6 is an enlarged typical cross sectional view taken through the outer peripheral portion of the double pulley, illustrating a preferred groove configuration.

Referring now to FIG. 6, the grooves 40 and 42 in the main, double pulley 12 are preferably, generally U-shaped in cross section with their side walls 52 and 54 diverging outwardly from the rounded bottoms 56. The diameter of the cable 46 is such that it normally rides well up in the grooves 40 and 42 and when a load or tension is applied to one or both of the cable runs 48 and 50, the cable is drawn somewhat deeper into said groove to increase the purchase therebetween to preclude the possibility of cable slippage in the grooves.

Particularly, when a pair of like cable pulley drive devices such as 10 and 10' are simultaneously driven by the transverse shaft 14, it is essential to maintain a synchronized movement of the cables 46 and 46' in both directions as provided by the reversible motor 27.

One example for the use of the cable pulley drive device is illustrated in FIG. 1. The description will be in the singular but it should be understood that all of the elements described will be associated with both devices 10 and 10' of FIG. 2. An elongated plate 60 extends along the length of the top edge of the load-carrying body of a dump truck, for example, and a slide rod 62 is fixed thereto in any conventional manner. A member such as the collar 64 is slidably journaled along the length of the rod 62. In practice, a plurality of collars 64, associated with an accordion or telescopic cover for the load-carrying body of a truck would be disposed on the rod 62, however, it is the rearmost collar 64, as disclosed, which must be driven to move the cover between open and closed dispositions relative to the load-carrying body. As this structure forms no part of this invention, no details thereof are illustrated beyond the rear slide collar 64.

The upper cable run 48 is attached to the collar 64 as at 66 to drive the collar 64 forwardly when the reversible motor 27 is driven in a first direction, and the lower cable run 50 extends rearwardly of the slide rod 62 around a tensioning pulley 68 and then forwardly to the point of attachment 66 to drive the collar 64 rearwardly when the motor 27 is driven a second direction. In a typical installation of the example above described, it is essential to maintain a substantially synchronized movement of the slide collars 64 on both sides to prevent cocking or binding of the cover associated therewith.

The tensioning pulley 68 is pivotally connected at 70 to a slide block 72 which is grooved along its upper and lower edges as at 73 to ride in a rectangular cut out 74 in the rear end of the plate 60. A bolt 75, fixed to the slide block 72, extends rearwardly through an end plate 76 and is adjustable by a pair of nuts 78 and 80 to regulate the cable tension and to lock the pulley slide block 72 in position.

As illustrated in dot-dash lines in FIG. 5, the main pulley 12 may include three or more annular grooves and the cable transfer pulley 24 a corresponding increase in number of grooves; groove 90 being added to main pulley 12 and groove 92 being added to transfer pulley 24 in FIG. 5, by way of illustration. Obviously, the cable 46 would be passed around all of the grooves in the manner, previously described, and a greater degree of purchase would be achieved between the main pulley 12 and the cable 46.

What is claimed is:

1. A pulley drive device comprising:
   A. a main pulley rotatably mounted between a pair of fixed, opposed side plates including,
      1. a pair of relatively closely spaced apart grooves about its peripheral face;
   B. a relatively small cable transfer pulley, rotatably journaled between said side plates, in a spaced relation to said main pulley, including,
      1. a single groove about its peripheral face;
   C. a drive means such as a cable, first, passed forwardly around the first groove of said pair, second, passed rearwardly around said single groove of said cable transfer pulley, and, third, passed forwardly around the second groove of said pair, said cable terminating in a pair of cable runs extending rearwardly from said main pulley;
   D. a reversible motor drive means, drivingly connected to said main pulley;
   E. each of said pair of grooves being generally U-shaped in cross section with opposed side walls diverging somewhat outwardly from a rounded bottom portion, the diameter of said cable being such that it normally rides well up in each groove; when a load or tension is applied to one or both of said cable runs, said cable being drawn deeper into each of said pair of grooves.

2. A pulley drive device as defined in claim 1 wherein each of said pair of grooves is generally U-shaped in cross section with its opposed side walls diverging somewhat outwardly from a rounded bottom portion, the diameter of said cable being such that it normally rides well up in each groove; when a load or tension is applied to one or both of said cable runs, said cable being drawn deeper into each of said pair of grooves.

3. A pulley drive device as defined in claim 2 including a pair of like spaced apart pulley drive devices mounted adjacent the opposed ends of a transverse drive shaft comprising said rotatable mounting for each of said devices.

4. A pulley drive device as defined in claim 3 wherein said reversible motor drive means comprises an electric motor, drivingly connected to said transverse drive shaft as by sprocket and chain means.

5. A pulley drive device as defined in claim 1 including tensioning means for at least one of said cable runs.

6. A pulley drive device as defined in claim 5 wherein the first of said pair of cable runs extends rearwardly around a tensioning pulley, then forwardly to a point of interconnection to the second of said pair of cable runs, said tensioning pulley being rotatably mounted to a slide block, including adjustment means, comprising said tensioning means, to selectably position said tensioning pulley relative to said main pulley.

7. A pulley drive device as defined in claim 1 including at least one additional groove in both the main pulley and cable transfer pulley whereby said cable would be passed around said two pulleys in a manner whereby it would sequentially engage all of the grooves in both pulleys and terminate in said pair of cable runs from the pair of outermost main pulley grooves.

* * * * *